H. L. FRITZ.
MOVING PICTURE CAMERA.
APPLICATION FILED JUNE 6, 1910.
1,070,954.
Patented Aug. 19, 1913.
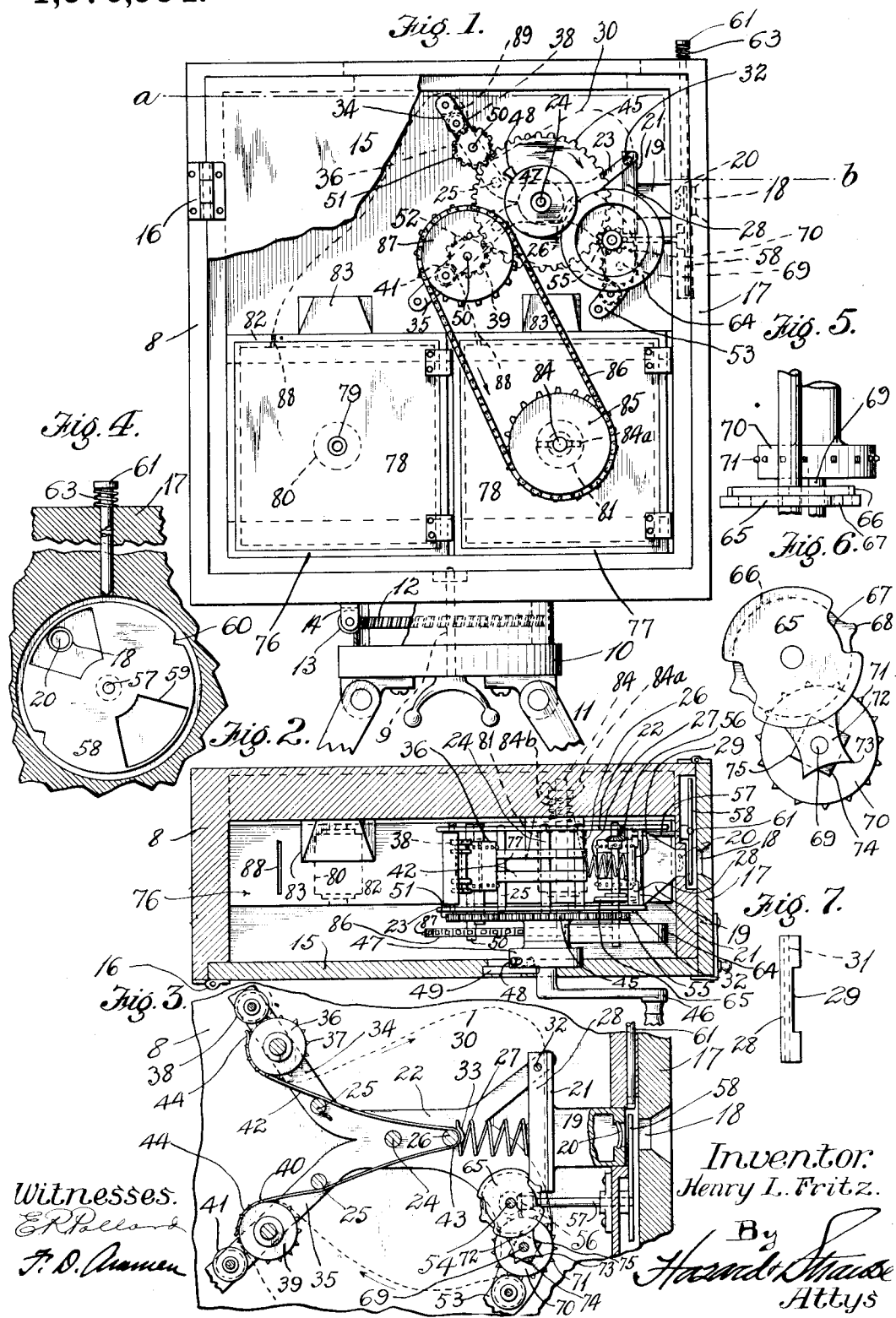
Inventor:
Henry L. Fritz.
By
Hazard & Strauss
Attys
Witnesses.
E. R. Pollard
F. D. Cramer

UNITED STATES PATENT OFFICE.

HENRY L. FRITZ, OF LOS ANGELES, CALIFORNIA, ASSIGNOR OF FIFTY-ONE ONE-HUNDREDTHS TO HENRY F. DALY, OF LOS ANGELES, CALIFORNIA.

MOVING-PICTURE CAMERA.

1,070,954. Specification of Letters Patent. Patented Aug. 19, 1913.

Application filed June 6, 1910. Serial No. 565,282.

*To all whom it may concern:*

Be it known that I, HENRY L. FRITZ, a citizen of the United States, residing at Los Angeles, in the county of Los Angeles and State of California, have invented new and useful Improvements in Moving-Picture Cameras, of which the following is a specification.

This invention relates to moving picture cameras such as used for exposing the films which are afterward used in moving picture machines for throwing moving pictures upon a screen.

The object of the invention is to provide improved means for guiding the film at the lens opening enabling the film to be more readily "threaded" across the opening.

Referring to the annexed drawing forming a part of this specification, Figure 1 is a side elevation of the camera, the drawing of which is partly broken away so as to show the inner mechanism; Fig. 2 is a horizontal section taken through the upper portion of the camera upon the line *a—b* of Fig. 1. Fig. 3 is an enlarged vertical section taken through the mechanism of the camera, certain parts being broken away, and illustrating the means for advancing and guiding the film. Fig. 4 is a section taken at the forward wall of the camera in front of the lens opening and illustrating the construction of the shutter and the means for holding the same closed. Fig. 5 is a plan showing one end of the main guide roller which guides the film near the lens box and illustrating the movement for periodically advancing the film and holding the same fixed when it is not being advanced. Fig. 6 is an end view of the parts shown in Fig. 5. Fig. 7 is a plan view of the guide block which directs the film at the back of the lens box.

To refer more particularly to the parts, 8 represents a camera box which is of rectangular form and mounted upon a suitable pivot screw 9, which is secured on the center of a table 10 forming a tripod 11. On this table 10 there is mounted a worm-wheel 12 with which a worm 13 meshes and this work is mounted in brackets 14 on the under side of the case or box 8 as shown. By rotating the worm 13 the camera can be adjusted on the vertical pivot 9 so as to point in any direction. The box 8 is of narrow width as viewed in plan and it is provided with a side door 15 which is adapted to swing open on hinges 16, and this door is constructed so that it is light proof, its edges fitting in rabbeted grooves formed in the edges of the box 8.

In the forward wall 17 of the box a lens opening 18 is formed behind which the lens box 19 is placed carrying a lens 20 and the rear end of this lens box is formed into a guide plate 21 which is elongated as shown in Fig. 3. Just to the rear of this guide plate 21, frame plates 22 and 23 are provided, disposed respectively at the left side and the right side of the interior of the box. These frame plates are connected by a plurality of horizontal studs or posts 24 and 25 as shown, there being one post 26 disposed forwardly of the others and this post forms a seat for the rear end of a coil spring 27, the forward end of which is attached to the back end of a guide block 28 shown in Fig. 7. This guide block 28 is formed on its forward face with a vertical guide groove 29 which guides the film 30 down across the rear side of the guide plate 21 as indicated in Fig. 3. The upper end of this block 28 is provided with an opening 31 through which a pin 32 may be run, the end of the said pin being received in the frame plates 22 and 23 as shown. This pin is removable to enable the guide block to be removed so as to permit the film to be placed across the rear end of the lens box and the block 28 is then replaced with spring 27 thrusting against the post 26.

In order to facilitate this mode of operation the rear end of spring 27 is bent to form a saddle 33 which seats against the post 26 as shown. From this arrangement it will be evident that the film can be readily applied to the groove 28 without necessitating its being passed down or threaded through the groove.

The rear ends of the frame plates 22 and 23 are formed with diverging arms 34 and 35 and between the arms 34 a guide roller 36 is mounted, having pins 37 near the ends thereof, and these pins are adapted to engage the perforations at the edges of the film so as to advance the film, as will be readily understood. Coöperating with the roller 36 there is a roller 38 which holds the film in contact with the roller 36 in the usual manner. A roller 39, which is similar to roller 36 is mounted between the arms 35 and it is provided with pins 40 and has a co-operating roller 41 similar to roller 38. In order to hold the film in contact with the rollers 36 and 39 as it passes around the same, two pairs of leaf springs 42 are provided which are made in one piece by an integral bow 43 which passes around the forward side of the post 26. These springs 42 rest against the posts 25 and their extremities are curved so as to form shoes 44 which rest against the surface of the rollers as indicated in Fig. 3.

On the outer side of the frame plate 23 a master gear 45 is mounted and this gear is adapted to be rotated by means of a crank 46 on the outer side of the case. This crank 46 has a hub 47 on the periphery of which a pin 48 projects, and this pin at each revolution operates a counter 49 in the door 15 and indicating the length of film which has passed the lens opening. The crank 46 is removed from the hub 47 for opening the door and is inserted through an opening therein after it is closed for turning said hub 47 and the master gear. This master gear drives both the rollers 36 and 39 for which purpose the shafts 50 of these rollers are provided with pinions 51 and 52 respectively, said pinions meshing with the master gear as indicated in Fig. 1. The forward ends of the frame plates 22 and 23 are formed with downwardly projecting arms 53 and between these arms 53 a counter-shaft 54 is rotatably held, said counter shaft being provided with a pinion 55 which meshes with the master gear as indicated. On the left side of this counter shaft bevel gears 56 are provided which connect with the shutter shaft 57 which extends upwardly and carries a shutter 58 which is illustrated in detail in Fig. 4. This shutter is in the form of a disk having two diametrically opposite openings 59 which are adapted to pass before the lens 20 as indicated in Fig. 4. When the openings are passing the lens an exposure takes place but when the body of the disk is disposed before the lens the light is cut off as will be readily understood. At diametrically opposite points on an axis at right angles to the axis joining the openings 59 the edge of the shutter disk is provided with notches 60 and these notches are adapted to be engaged by a pin 61 which passes down through the wall 62 of the box. This pin has an enlarged head, against the under side of which thrusts a coiled spring 63, the bottom of which rests on the cover of the box as indicated.

The right end of shaft 54 projects as shown and carries a fly wheel 64 which tends to cause a uniform velocity of rotation for the mechanism. On this shaft 54 adjacent to the inner face of the frame plates 23 a stop wheel 65 is mounted which stop wheel is shown in detail in Figs. 5 and 6. It is formed with a rabbet groove 66 and two diametrically opposite points of the wheel 65 are provided with notches 67, and the bottom of the rabbet groove at these points is provided with projecting teeth 68. Parallel with the shaft 54 there is provided a roller shaft 69 which is provided with a roller 70 having teeth 71 adapted to be received in the perforations near the edge of the film, and the shaft 69 is provided with a wheel 72 having concave side edges which lie against the curved periphery of the stop wheel 65 and presenting four points or teeth 73 as shown. On the shaft 69 opposite the rabbet groove 66 a head 74 is attached, said head being of angular form and presenting four corners or teeth 75, one of which normally lies adjacent to the bottom of the rabbet groove as indicated. With this arrangement at each half revolution of the wheel 65 one of the teeth 68 strikes one of the corners or points 75 of the head 74 and gives the shaft 69 a quarter revolution. It should be understood that normally the wheel 65 locks the shaft 69 against rotation by reason of the star wheel 72, but at the moment that the tooth 68 strikes the corner of the head 74 a notch 67 permits the star wheel to rotate through a quarter turn. In this way the roller 70 is periodically given a rotation and in the interval it is held fixed against rotation. In this manner the film as it passes the focus point behind the lens is held fixed for each exposure and just at the time the film is being held fixed one of the openings 59 of the shutter is passing the lens.

In the lower part of the camera box a delivery reel box 76 is provided and a take up reel box 77. These boxes are rectangular in form and have hinged doors 78 for closing their sides. Their sides and the side doors 78 are provided with openings 79 to receive the ends of the spools 80 and 81 carrying the film. In order to hold the boxes in their proper position they are made wide enough so that they substantially fill the camera box lengthwise, and adjacent to the cover wall 82 of the film box blocks 83 are provided which are attached to the side wall of the camera box and hold the film box against moving upwardly in the camera box when it is being handled. The take up film box 77 is provided with a removable spindle 84 which is applied to the bore of the spool 81 so as to rotate the spool when the spindle is rotating and the spindle is adapted to be rotated by means of a sprocket wheel 85 which is rigidly attached thereto and rotated by means of a sprocket chain 86 which extends upwardly and passes around a sprocket wheel 87 carried on the shaft 50 of the aforesaid pinion 52. The spindle 84 extends beyond the rear wall of the take up box and is provided with a wing nut 84ª for adjusting a coiled tension spring 84ᵇ which is disposed around the spindle and seated against the side of the box as indicated in Fig. 2.

The walls 82 of the film boxes are provided with guide openings or slots 88 through which the film 30 passes. The course of the film in passing from the delivery box to the take up box is indicated by the dotted line in Fig. 1. It passes upwardly from the box 76 and passes around the guide roller 89 connecting the upper ends of the arms 34 of the frame plates and just above the roller 38. From this point the film passes downwardly between the rollers 36 and 38 and then passes over in a loop so that it can pass down through the guide block 28. After leaving the guide block 28 it passes around the guide pulley 70 which is controlled by the stop movement shown in Fig. 6, and thence it passes between the guide rollers 39 and 41; it then passes downwardly through the slot 88 of the take up box where it wraps upon the spool 81.

In the operation of the device the rotation of master gear 45 rotates the guide rollers and advances the film across the rear end of the lens box, at the same time the stop movement shown in Fig. 6 is driven so as to hold the film and advance it periodically at this point. When the film is being held fixed by the operation of the stop movement shown in Fig. 6 one of the openings 59 of the shutter will pass the lens opening and make an exposure of the film. The light is then cut off by the body of the disk 58 and while it is cut off the film advances and stops again for the next exposure.

Special attention is called to the means for removably securing the guide block 28 in position and to the fact that the removability of this block greatly facilitates the "threading" of the film across the rear end of the lens box. After the film has been completely exposed it can be completely wrapped up on the spool 81 and the spindle 84 can then be removed so as to permit the removal of the box 77 with its film. Another box can then be substituted and provided with the spool 80 which was left in the box 76 and from which the film has just been uncoiled. This spool 80 can then be mounted on the spindle 84 like the spool 81 and the new film can then be threaded down through the slot 88 and attached so that it will wrap upon the spool in the same manner as before.

What I claim is:—

1. An apparatus of the class described, comprising a box having a lens therein, means for advancing a film adjacent to the lens, a frame mounted in said box having arms extending toward the lens, a grooved guide block supported between said arms, a removable transverse bar carried by said arms to removably support said guide block, and a spring bearing against said guide block for holding it in position over the film.

2. An apparatus of the class described, comprising a box having a lens, a film guided adjacent to said lens, a frame mounted to the rear of said film guide having arms projecting from the front end thereof, a film feeding mechanism mounted between one set of arms, a guide block pivotally mounted between another set of arms and adapted to hang opposite the film guide, a transverse bar carried by said frame, a spring interposed between the said bar and the guide block for holding it against the film, the said frame also having rearwardly extending bifurcated arms, feed rollers pivoted between the upper and lower bifurcated arms and springs carried by the said transverse bar of the framing bearing at their ends against said feed rollers, and other bars upon said frame for making said springs effective in their pressure upon the feed rollers.

3. An apparatus of the class described, comprising a box having a lens adapted to receive film carrying and receiving receptacles, a guide for the film adjacent to said lens, a mechanism carrying frame mounted adjacent to said guide, a guide block pivoted in one end thereof and adapted to press the film against said guide, a transverse bar mounted in said frame, a coiled spring interposed between the said bar and the said guide block, loop feeding rollers provided with teeth carried by said frame, and a plurality of bowed springs mounted in the frame and carried by said transverse bar, the said springs having curved end portions adapted to engage the film adjacent and inside of the teeth on the feed rollers.

In witness that I claim the foregoing I have hereunto subscribed my name this 21 day of May, 1910.

HENRY L. FRITZ.

Witnesses:
F. D. AMMEN,
EDMUND A. STRAUSE.